United States Patent [19]

Abe et al.

[11] Patent Number: 4,817,576

[45] Date of Patent: Apr. 4, 1989

[54] VAPORIZED FUEL CONTROL APPARATUS FOR INTERNAL COMBUSTION ENGINES

[75] Inventors: Tomoaki Abe, Obu; Masashi Kiyono, Anjo; Mitsunori Takao, Kariya, all of Japan

[73] Assignee: Nippondenso Co., Ltd., Kariya, Japan

[21] Appl. No.: 123,523

[22] Filed: Nov. 20, 1987

[30] Foreign Application Priority Data

Dec. 5, 1986 [JP] Japan ................. 61-290947

[51] Int. Cl.$^4$ ............................. F02M 39/00
[52] U.S. Cl. ..................... 123/519; 123/518; 123/516
[58] Field of Search ............... 123/516, 518, 519, 520, 123/521

[56] References Cited

U.S. PATENT DOCUMENTS

| 3,289,711 | 6/1966 | Hall | 123/519 |
| 3,757,753 | 9/1973 | Hunt | 123/519 |
| 3,884,204 | 5/1975 | Krautwurst | 123/519 |
| 3,957,025 | 5/1976 | Heath | 123/518 |
| 4,000,727 | 1/1977 | Walker | 123/519 |
| 4,641,623 | 2/1987 | Hamburg | 123/520 |
| 4,651,889 | 3/1987 | Uranish | 123/519 |
| 4,659,346 | 4/1987 | Uranish | 123/519 |

FOREIGN PATENT DOCUMENTS

| 0164763 | 12/1980 | Japan | 123/518 |
| 0161952 | 12/1980 | Japan | 123/519 |
| 61-19962 | 1/1986 | Japan | 123/519 |
| 61-53451 | 3/1986 | Japan | 123/519 |

Primary Examiner—Carl S. Miller
Attorney, Agent, or Firm—Cushman, Darby & Cushman

[57] ABSTRACT

A vaporized fuel control apparatus for an internal combustion engine. Fuel vapor formed in the fuel tank during the refuelling period is adsorbed to a refuelling canister and fuel vapor formed in the fuel tank during the engine running period is adsorbed to a running canister. The canisters are controlled in a manner that the amount of the fuel vapor discharged into the intake system of the engine from the refuelling canister is smaller than that of the running canister.

7 Claims, 6 Drawing Sheets

VAPORIZED FUEL CONTROL APPARATUS FOR INTERNAL COMBUSTION ENGINES

BACKGROUND OF THE INVENTION

The present invention relates to a vaporized fuel control apparatus for an internal combustion engine, which is designed so that fuel vapor formed in the fuel tank is recovered and delivered to the intake system of the engine.

Apparatuses of this type are known in the art in which the fuel vapor generated in the fuel tank is adsorbed to a canister so that when the engine is running, the fuel vapor is suitably discharged into the intake system of the engine and burned in the combustion chamber of the engine, thereby preventing the emission of the fuel vapor in the fuel tank directly into the atmosphere (e.g., Japanese Unexamined Publication No. 61-19962).

Then, the recent trend has been toward strengthening the regulations on the automotive exhaust emission control and there has also been a movement toward limiting the amount of fuel vapor escaping from the fuel filler port during the refuelling period and preventing the pollution of the atmosphere. However, there is a disadvantage that the amount of fuel vapor formed during the refuelling period is so large that when the fuel vapor is first adsorbed to the canister and then discharged into the intake system of the engine, the air-fuel ratio of the mixture supplied to the engine is decreased considerably (enriched) so that not only the CO and HC constituents in the exhaust gases by the combustion are increased but also the operating performance of the engine is deteriorated.

SUMMARY OF THE INVENTION

It is therefore an object of the present invention to provide an improved vaporized fuel control apparatus so designed that noting the fact that the amount of fuel vapor formed during refuelling periods is large but it occurs at long intervals, the emission of fuel vapor into the atmosphere during refuelling periods is positively prevented without increasing the harmful constituents in the engine exhaust gases and deteriorating the operating performance of the engine.

In accordance with a first aspect of the invention, there is provided a vaporized fuel control apparatus for an internal combustion engine in which fuel vapor formed in the fuel tank is discharged into the intake system of the engine, and the apparatus comprises, as shown in FIG. 1, a refuelling canister for adsorbing fuel vapor formed in the fuel tank during the refuelling period, a running canister for adsorbing fuel vapor formed in the fuel tank during the engine running period, vapor discharge rate control means for discharging the fuel vapor adsorbed to each of the canisters into the intake system of the engine and for controlling the amount of fuel vapor discharged into the engine intake system from each canister in such a manner that the discharge rate of the refuelling canister is smaller than that of the running canister.

In accordance with a second aspect of the invention, the apparatus according to the first aspect further includes refuelling vaporized fuel induction means for detecting the period of refuelling to introduce vaporized fuel formed in the fuel tank during the refuelling into the refuelling canister.

In accordance with the first aspect, there is a great effect that the emission of vaporized fuel into the atmosphere during refuelling periods is positively prevented without increasing the amounts of harmful constituents in the exhaust gases from the engine and deteriorating the operating performance of the engine.

In accordance with the second aspect of the invention, there is a great effect that no vaporized fuel is adsorbed to the refuelling canister except during refuelling periods so that the vaporized fuel adsorbed to the refuelling canister is fully discharged into the intake system of the engine until the next refuelling and thus the adsorption of vaporized fuel caused during the next refuelling is positively effected.

DESCRIPTION OF THE PREFERRED EMBODIMENTS

Figure 1:
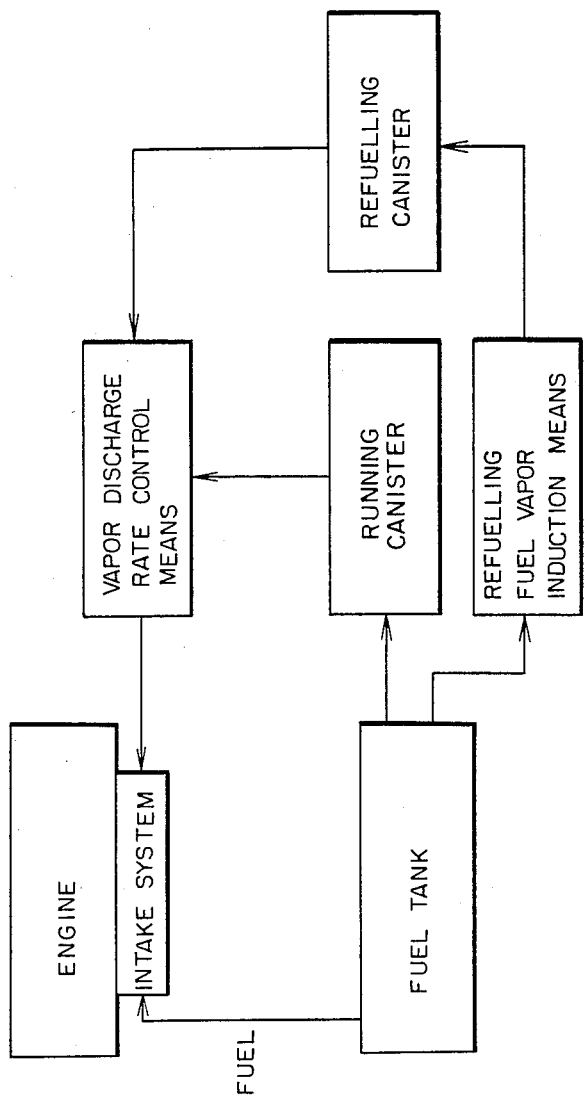
FIG. 1 is a block diagram showing a basic construction of an apparatus according to the invention.
Figure 2:
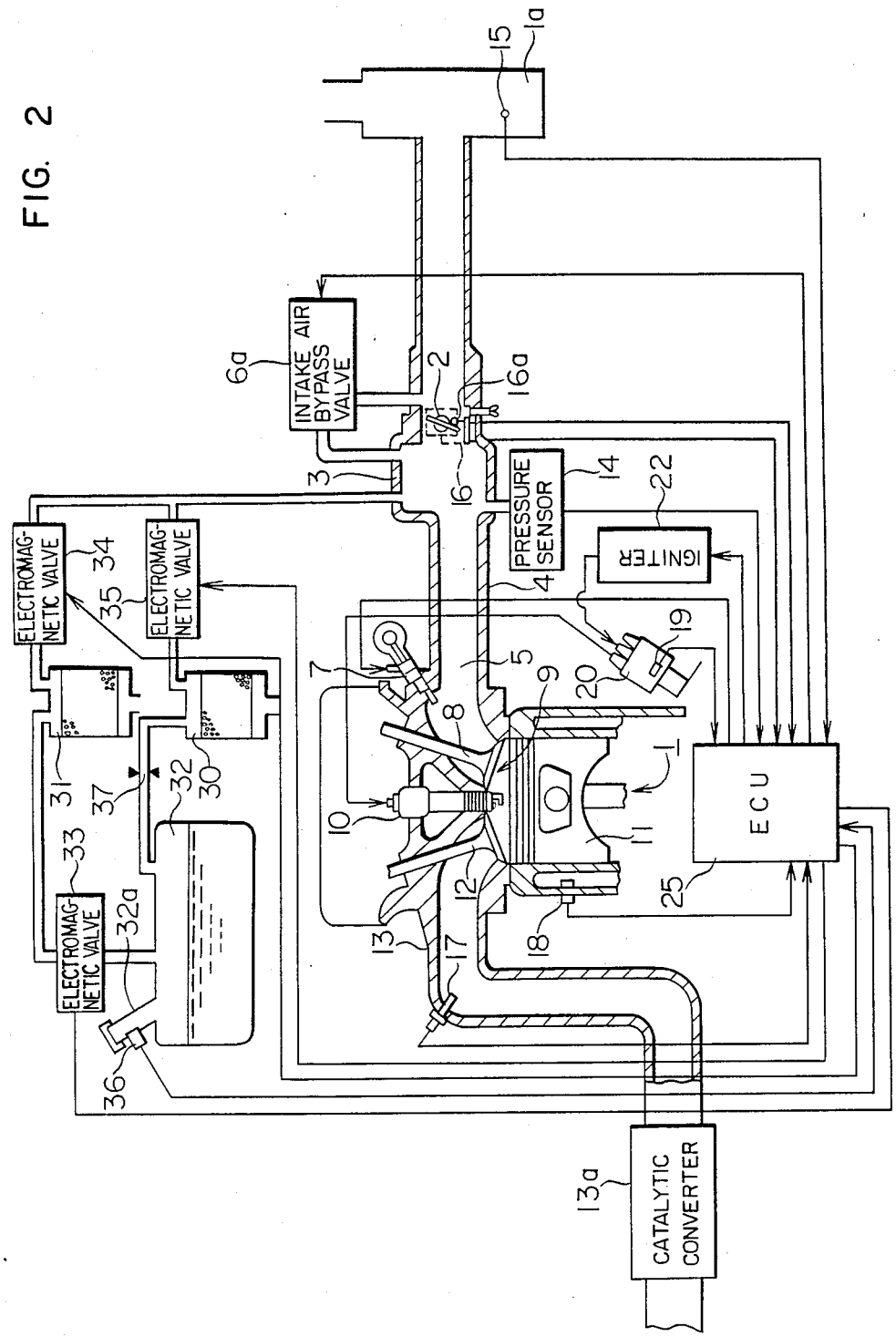
FIG. 2 is a partially sectional schematic diagram showing an embodiment of the apparatus according to the invention.

Referring to FIG. 2, there is illustrated an example of detailed connection of the various parts in an apparatus of the invention. A throttle valve 2 for controlling the amount of air flow to an engine 1 is positioned just in front of a surge tank 3 so that the air is drawn into a combustion chamber 9 of the engine 1 through an intake pipe 4 and an intake port 5 by the opening of an intake valve 8 and also the air is mixed with the fuel from an injection valve 7 controlled by an electronic control unit (ECU) 25 so that the mixture is ignited by a spark plug 10 and the exploded and burned mixture presses a piston 11 downward thereby producing an engine torque. The gases resulting from the combustion are discharged into the atmosphere through an exhaust pipe 13 and a catalytic converter 13$a$ when an exhaust valve 12 is opened by the movement of the piston 11. In addition, the surge tank 3 is provided with an intake air bypass valve 6$a$ so as to control the idle speed of the engine 1. The necessary information for controlling the injection valve 7 are obtained from a pressure sensor 14 for estimating the flow of intake air to the engine 1 in terms of the pressure in the intake pipe, an intake air temperature sensor 15 mounted within an air cleaner 1$a$ to detect the intake air temperature, a throttle sensor 16 mounted on the throttle shaft about which the throttle valve 2 rotates so as to detect the position of the throttle valve 2, a fully-closed throttle switch 16$a$ for detecting the full-closed position of the throttle valve 2, an air-fuel ratio sensor 17 mounted in the exhaust pipe 13 to detect the oxygen concentration of the exhaust gases, a cooling water temperature sensor 18 for detecting the cooling water temperature of the engine 1, and a rotational angle sensor 19 mounted in a distributor for distributing an ignition high-voltage from an igniter 22 to the spark plug of each cylinder to detect the rotational angle of the engine 1, and these information are applied to the electronic control unit 25. Of these sensors, the throttle sensor 16 includes a potentiometer for generating a voltage corresponding to the throttle position.

Numerals 30 and 31 designate canisters respectively used during engine running periods and refuelling periods to adsorb fuel vapor formed in a fuel tank 32 so that the running canister 30 adsorbs fuel vapor usually formed in the fuel tank by an evaporation phenomenon and the refuelling canister 31 adsorbs fuel vapor delivered from the fuel tank 32 during the refuelling. An electromagnetic valve 33 is arranged in the vapor induction pipe between the refuelling canister 31 and the fuel tank 32 so as to be opened only during refuelling periods to introduce fuel vapor into the refuelling canister 31. In addition, electromagnetic valves 34 and 35 are respectively mounted in the vapor induction pipes between the canisters 30 and 31 and the surge tank 3 so as to control the amount of fuel gas taken from each of the canisters 30 and 31. Mounted in a fuel filler port 32a of the fuel tank 32 is a refuelling detection switch 36 for detecting the detection of a filler nozzle into the fuel filler port 32a. On the other hand, the induction pipe between the running canister 30 and the fuel tank 32 has an inner diameter which is ¼ to 1/5 of that of the induction pipe for the refuelling canister 31 and also a restrictor 37 is formed to control the flow rate of fuel vapor. Also, the capacity of the refuelling canister 31 is selected 5 to 6 times the capacity of the running canister 30 of the conventional type.

Figure 3A:
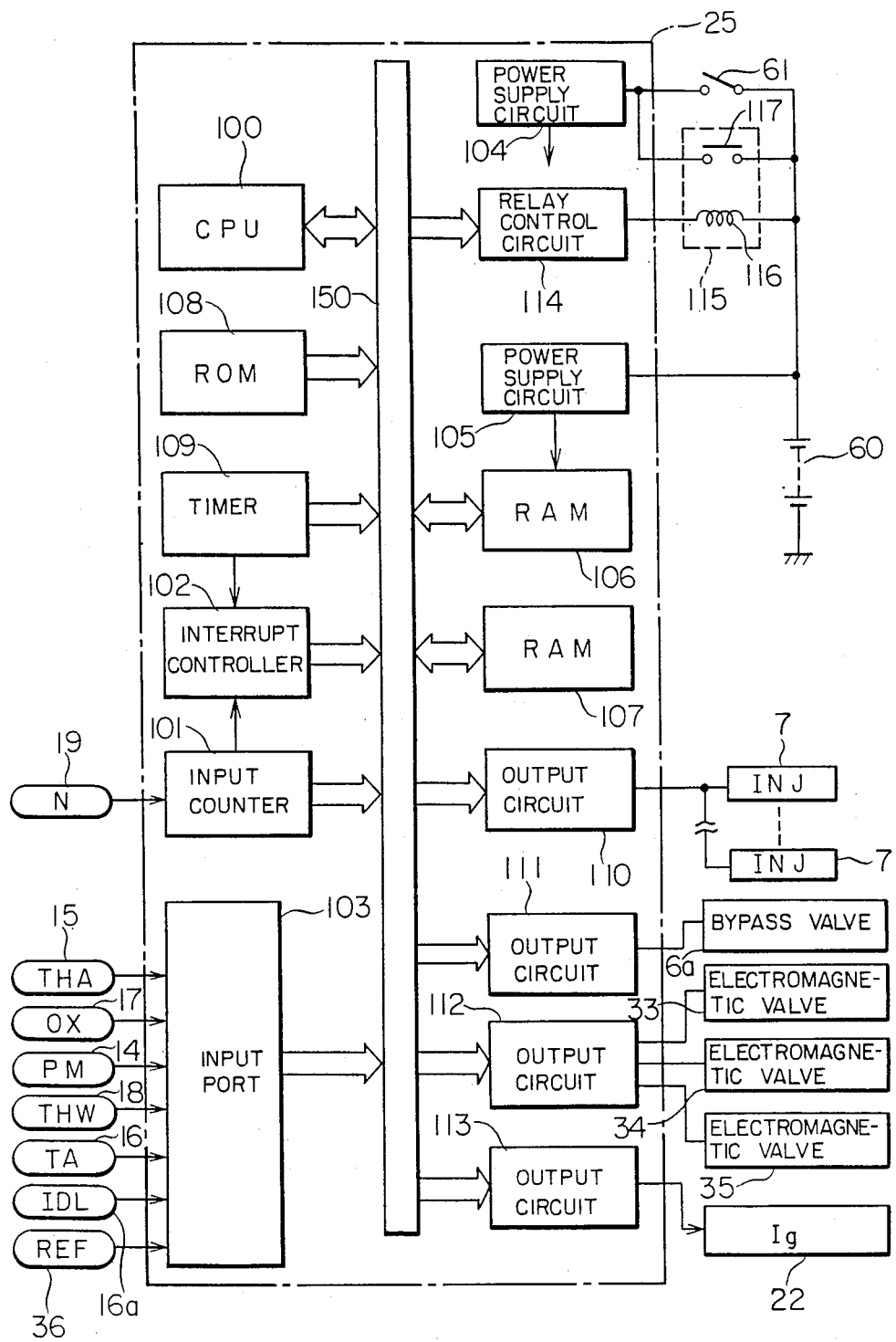
FIG. 3A is a block diagram of the electronic control unit in the apparatus shown in FIG. 2.

The electronic control unit 25 includes mainly a microcomputer and its internal construction is shown in FIG. 3. The electronic control unit 25 includes a bus line 150, a read-only memory (ROM) 108, a random-access memory (RAM) 107, an RAM 106 power-supplied through its special power supply circuit 105 from battery 60 even in OFF state of an IG (ignition) switch 61, an internal timer 109, an input counter 101 for measuring the period of inputs from the rotational angle sensor 19, and an interrupt controller 102 responsive to the contents of the input counter 101 and the internal timer 109 to interrupt the execution of a central processing unit (CPU) 100, and the transmission of data is effected between an input port 103 and output circuits 110 to 113 for respectively driving the fuel injection valves 7, the intake air bypass valve 6a, the electromagnetic valves 33 to 35 and the igniter 22. The input port 103 includes a plurality of A/D conversion ports for subjecting the inputs to A/D conversion to receive them as digital values of 8 to 10 bits long and a plurality of digital input ports for discriminating only the levels of the input voltages so that the outputs of the sensors 15, 17, 14, 16 and 18 are connected to the former and the outputs of the sensors 16a and 36 are connected to the latter. Also, the output circuits 110 and 113 are connected to the bus line 150 to respectively drive the fuel injection valves 7 and the igniter 22 and determine the quantity of fuel injected and the timing of ignition in accordance with the data sent from the CPU 100.

The ECU 25 includes a relay control circuit 114 so that when the IG switch 61 is turned on thus bringing the ECU 25 into operation, a coil 116 of a relay 115 is energized and a contact 117 is closed. With the engine at rest, even if the IG switch 61 is turned off, the current flows to the ECU 25 through the contact 117 so that the refuelling detection switch 36 is monitored for a given time, e.g., 10 minutes after the turning off of the switch 61. If the refuelling detection switch 36 is turned on, the contact 117 is maintained in the closed position until the switch 36 is turned off or for 10 minutes and then the relay control circuit 114 interrupts the current flow to the coil 116 thus disconnecting itself from the power source. This construction is the same as the initialization after the key-off of a rotary S/M ISC valve and it is a well known method.

Figure 3B:
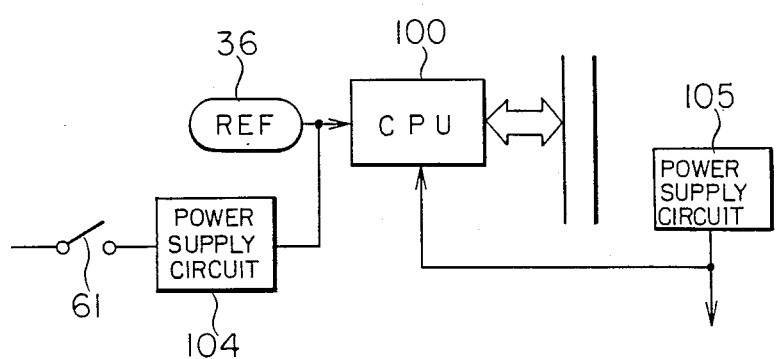
FIGS. 3B and 3C are diagrams showing partial modifications of FIG. 3A.

In addition to the above-described construction, it is possible to arrange as shown in FIG. 3B so that the power is supplied to the CPU 100 from a power supply circuit 105 and upon the key-off the CPU 100 is placed in a so-called sleep mode requiring a very small current consumption.

Figure 3C:
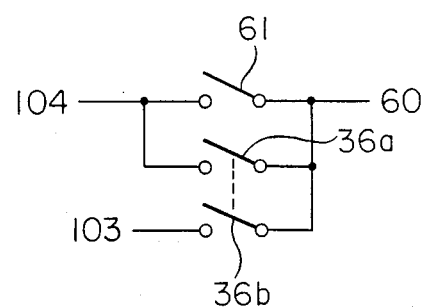

According to the modified arrangement shown in FIG. 3B, power output of the power supply circuit 105 is supplied to the CPU 100, which operates to stop supplying power to the coil 116 of the relay 115 by detecting turn-off of the IG switch 61 and to set itself in a sleep mode where current consumption of the CPU itself is very small. The output terminal of power supply circuit 104 is connected to sleep-mode release terminal of the CPU 100. The output terminal of the refuelling detection switch 36 is connected not only to the input port 103, but also to the sleep-mode release terminal of the CPU 100. Accordingly, when the CPU 100 was urged to release the sleep-mode, the CPU 100 operates first to supply current to the coil 116 and then to check output signal of the refuelling detection switch 36. With detection of on state of the switch 36, the CPU 100 identifies it as a refuelling sign and performs the refuelling step, i.e., opening of the valve 33. With detection of off state of the switch 36, the CPU 100 operates to close the valve 33 and again assumes the sleep mode. In case of detecting off state of the switch 36 when the CPU was urged to release the sleep mode, the CPU performs the usual initializing step and starts the engine control. A more simplified arrangement may be used as shown in FIG. 3C with two refuelling detection switches 36a and 36b which turn on during refuelling period. One switch 36a is connected in parallel with the IG switch 61 connected between the power supply circuit 104 and the battery 60, while the other switch 36b is connected between the input port 103 and the connection point of the switch 36a connected to the battery 60. Thus, with the filler nozzle inserted into the fuel filler port 32a, the ECU 25 is started by the turn-on of the one switch 36a similarly as done by turn-on of the switch 61. It is possible to discriminate whether refuelling operation or the turn-on of the IG switch by the on or off state of the other switch 36b.

The output circuit 112 applies a drive signal to each of the electromagnetic valves 34 and 35 and the drive signal comprises repetitions of on and off. Thus, by controlling the average valve opening times of the electromagnetic valves 34 and 35 in accordance with the duty cycles of the drive signals, it is possible to separately control the amounts of vapor discharged into the intake system. Also, the output circuit 112 outputs a drive signal for opening the electromagnetic valve 33 when refuelling the fuel tank 32.

The fuel vapor thus adsorbed to the canisters 30 and 31 are respectively drawn out through the electromagnetic valves 34 and 35 by the negative pressure in the surge tank 3 and are burned in the combustion chamber 9 of the engine 1. If the electromagnetic valves 34 and 35 are not used, depending on the amount of fuel vapor adsorbed to the canisters 30 and 31, the fuel vapor is delivered in a very large quantity into the surge tank 3 so that due to the fuel vapor playing no part in the control by the electronic control unit 25, there is the danger of the air-fuel ratio of the mixture greatly deviating from the desired valve and thereby causing the deterioration of the operating performance and the emission level and hence the stopping of the engine. For this reason, it has been the practice in the past to control the opening and closing of the electromagnetic valve located between the canister and the surge tank 3 from the canister.

In the past, the canister to be controlled has been the running canister 30 and the installation of the refuelling canister 31 on the vehicle has recently been necessitated by the social demand. The elimination of the fuel vapor from the running canister 30 has been simply effected in response to the discharge of fuel vapor from the fuel tank 32. However, the adsorption of fuel vapor to the refuelling canister 31 is effected very rapidly in a large quantity as the fuel is filled into the fuel tank 3 so that immediately after the refuelling the refuelling canister 31 is storing the fuel vapor up to its full capacity. At this time, the engine 1 is of course at rest and therefore the fuel vapor cannot be discharged into the surge tank 3. It is a common practice that after the refuelling has been completed, in the condition where the temperature of the canister is still high due to the heat of adsorption and the fuel vapor tends to be easily eliminated, the engine is started and the vehicle starts running. At this time, in addition to its large capacity, the condition of the refuelling canister 31 is such that the fuel vapor tends to be easily eliminated so that if the fuel vapor is delivered to the surge tank 3 with the same passage resistance as the running canister 30 or the same electromagnetic valve duty cycle as in the case of the running canister 30, a very large quantity of fuel component is supplied into the combustion chamber 9 of the engine 1 independently of the control by the electronic control unit 25 and there is the danger of ruining the air-fuel ratio control.

Thus, while the discharge of fuel vapor from the refuelling canister 31 is effected in a large quantity, it is only necessary that the fuel component in the activated carbon is eliminated during a long interval between refuelling events. This is in contrast to the delivery of the fuel vapor from the running canister 30 which must be effected along with the adsorption of fuel vapor. Therefore, by effecting the elimination of the fuel vapor from the refuelling canister 31 little by little, that is, if it is effected by fully throttling the delivery passage to the surge tank 3, it is possible to reduce the effect on the engine control.

Figure 4:
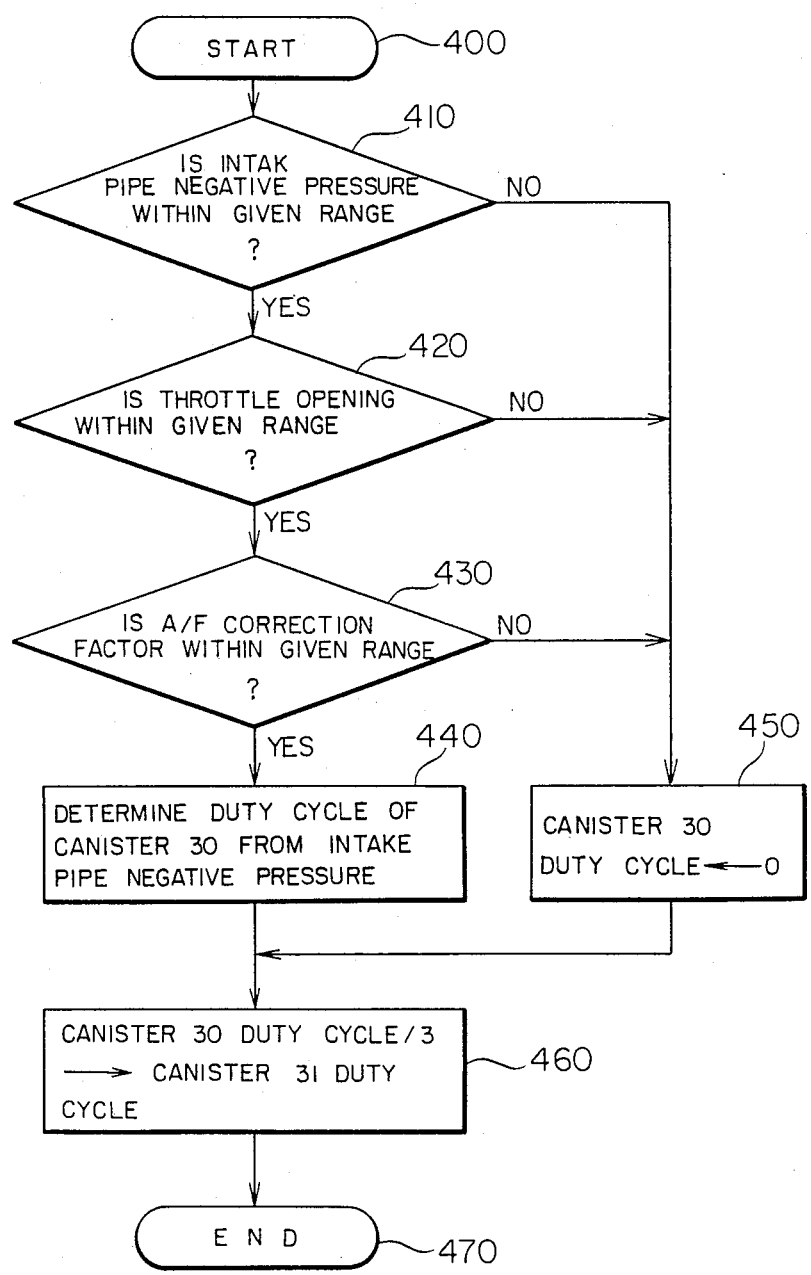
FIG. 4 is a flow chart for explaining the operation of the apparatus shown in FIG. 2.
Figure 5:
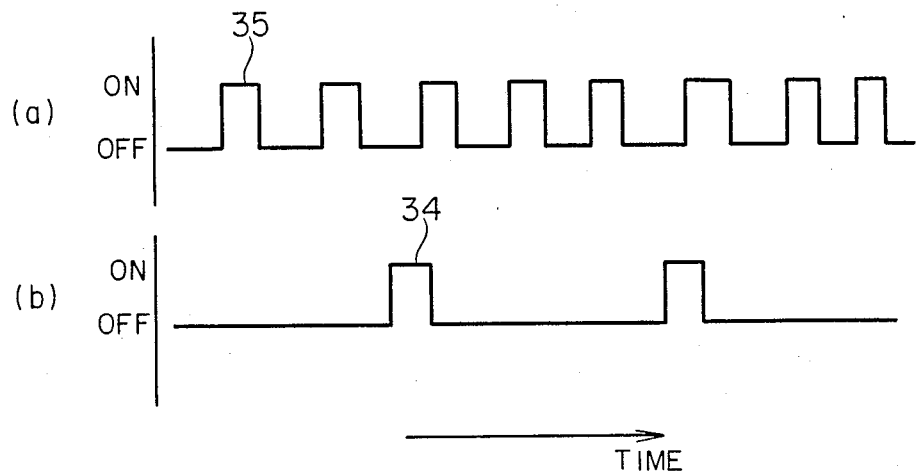
FIGS. 5($a$)–($b$) show ON-OFF signal waveforms for operating the electromagnetic valves 35 and 34, respectively, in the apparatus of FIG. 2.

Referring to FIG. 4, there is illustrated a flow chart of a program module 400 required for the realization of the above-mentioned control by the electronic control unit 25. This module is started at the engine control program period or at intervals of about 100 ms. At a step 410, the intake pipe negative pressure is measured first to determine whether the value of the negative pressure is suitable for effecting the purge. If it is, a transfer is made to a step 420. At the step 420, it is determined whether the throttle valve opening is within a given range, e.g., 10° or over. If the condition is met, a transfer is made to a step 430. At the step 430, the value of an air-fuel ratio (A/F) correction factor is detected so that if the value is on the rich side and not in a range which is improper for the purging of fuel vapor, a transfer is made to the next step 440 where the duty cycle of the running canister 30 is determined in accordance with the intake pipe negative pressure. If none of the conditions of the steps 410, 420 and 430 is met, a transfer is made to a step 450 where the duty cycle of the running canister 30 is set to zero. From either of the steps 440 and 450 a transfer is made to a step 460 where the duty cycle of the running canister 30 is reduced ⅛ and it is determined as the duty cycle of the refuelling canister 31. The thus determined duty cycles of the canisters 30 and 31 are stored in the RAM 107 and are then read by an electromagnetic valve control routine which is not shown, thereby driving the electromagnetic valves 34 and 35, respectively. The on-off waveforms for the electromagnetic valves 35 and 34 are shown in (a) and (b) of FIG. 5. Then, the ON pulses of the electromagnetic valves 34 and 35 at these duty cycle frequencies may be synchronized to produce the duty cycle signal of the electromagnetic valve 34 by dividing its frequency or thinning out the duty cycle signal of the electromagnetic valve 35. For instance, each on pulse of the electromagnetic valve 34 may be produced for every n ON pulses of the electromagnetic valve 35 as shown in the Figure.

Then, it is apparent that if the canisters 30 and 31 are functionally separated from each other, they are expected to produce the same effect and there are instances where they are advantageously mounted within the single container by the provision of a partition.

Further, while, in the embodiment described above, the intake pipe negative pressure is also utilized in determining the duty cycles of the canisters, the invention is not limited thereto so that where the system of measuring the amount of intake air flow to determine the desired fuel injection quantity is used, the duty cycles may be determined by utilizing the amount of intake air flow or the ratio of the intake air flow to the engine speed.

Figure 6:
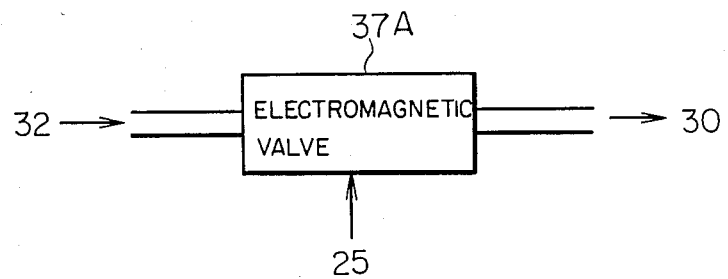
FIG. 6 shows the construction of a principal part of another embodiment of the apparatus according to the invention.

Still further, while, in the above-described embodiment, the restrictor 37 is formed in the induction pipe between the fuel tank 32 and the running canister 30, an electromagnetic valve 37A which is closed during refuelling periods may be provided in place of the restrictor 37 as shown in FIG. 6.

We claim:

1. A vaporized fuel control apparatus for an internal combustion engine, which is adapted to discharge fuel vapor formed in a fuel tank into an intake system of an engine, said apparatus comprising:
   a refuelling canister for adsorbing fuel vapor formed in said fuel tank during a refuelling thereof;
   a running canister for adsorbing fuel vapor formed in said fuel tank during a running of said engine;
   a first electromagnetic valve provided in a path for discharging the fuel vapor adsorbed by said refuelling canister into said intake system of said engine for selectively controlling said discharging;
   a second electromagnetic valve provided in a path for discharging the fuel vapor adsorbed by said running canister into said intake system of said engine for selectively controlling said discharging;
   first setting means for setting a valve duty cycle of said second electromagnetic valve;
   second setting means for setting a valve duty cycle of said first electromagnetic valve at a value equal to one nth, where n is an integer not smaller than 2, of the valve duty cycle of said second electromagnetic valve set by said first setting means; and output means for outputting electrical signals to said first and to said second electromagnetic valves in parallel, one of said electrical signals being representative of said valve duty cycle of said first electromagnetic valve set by said second setting means, and an other electrical signal representative of said valve duty cycle of said second electromagnetic valve set by said first setting means respectively.

2. An apparatus according to claim 1, wherein said control means controls in a manner that a fuel vapor discharge duty cycle of said refuelling canister is smaller than a fuel vapor discharge duty cycle of said running canister.

3. An apparatus according to claim 2, wherein said control means controls in a manner that the fuel vapor discharge duty cycle of said refuelling canister is 1/n of the fuel vapor discharge duty cycle of said running canister.

4. An apparatus according to claim 1, further comprising refuelling fuel vapor induction means for detecting refuelling of said fuel tank whereby fuel vapor formed in said fuel tank during said refuelling is introduced into said refuelling canister.

5. An apparatus according to claim 4, wherein said refuelling canister is greater in capacity than said running canister.

6. An apparatus according to claim 1, further including a refuelling detection switch provided in a fuel tank and means for enabling said refuelling canister to adsorb fuel vapor for a given time period after turnoff of an engine key switch and in response to detection of said detection switch.

7. An apparatus according to claim 1, further including a refuelling detection switch provided in a fuel tank and means for enabling said refuelling canister to adsorb fuel vapor for a given time period in sleep mode by a RAM backup power supply circuit after turn-off of an engine key switch.

* * * * *